Jan. 30, 1962 J. J. EACHUS 3,018,954

ERROR CHECKING DEVICE EMPLOYING TRISTABLE ELEMENTS

Filed Dec. 18, 1959 2 Sheets-Sheet 1

INVENTOR.
JOSEPH J. EACHUS
BY Henry L. Hanson
ATTORNEY

ERROR CHECKING DEVICE EMPLOYING TRISTABLE ELEMENTS

Filed Dec. 18, 1959 2 Sheets-Sheet 2

INVENTOR.
JOSEPH J. EACHUS
BY Henry L. Hanson
ATTORNEY

United States Patent Office 3,018,954

Patented Jan. 30, 1962

3,018,954

ERROR CHECKING DEVICE EMPLOYING TRISTABLE ELEMENTS

Joseph J. Eachus, Cambridge, Mass., assignor to Minneapolis-Honeywell Regulator Company, Minneapolis, Minn., a corporation of Delaware Filed Dec. 18, 1959, Ser. No. 860,456
10 Claims. (Cl. 235—153)

A general object of the present invention is to provide a new and improved apparatus useful in checking the manipulation of digital data. More specifically, the present invention comprises a new and improved information handling apparatus which is characterized by the ability of the circuit to provide an accurate check of the data manipulated using a minimum number of components and relatively simple logical circuitry.

It has become well known in the art of data processing to manipulate digital data and check the manipulation of the data by way of a satellite data representation carried along with the data. In its elemental form, this type of checking is referred to as a parity check wherein a single binary digit is transferred along with the digital data in accordance with whether or not the number of "ones" in a particular grouping of information is odd or even. In its more complex form, which is capable of yielding a higher degree of accuracy than the simple parity form, there may be several bits of information transferred along as a satellite with the basic data group. The generation of these satellite bits may be effected by adding the bit positions where a predetermined bit is located in accordance with a predetermined binary progression. The bits of data may be added in accordance with some predetermined modulus, such as modulo 9, modulo 3, or the like.

A patent which discloses a modulo *n* type of checking system is one issued to Richard M. Bloch, bearing Re-Issue Number Re. 24,447, entitled "Diagnostic Information Monitoring System." In this patent, if there is a transfer of data, the data transferred is checked against the satellite or weight count and if there is disagreement, an error will be indicated.

In considering the various circuit requirements of checking circuitry of the present type, it is essential that the number of circuit components required for a particular checking circuit be reduced to a minimum, and that such a circuit reduction not jeopardize or weaken the check which the circuitry is intended to accomplish. Heretofore, when static logic has been utilized in implementing checking circuitry of the type contemplated herein, the circuit have comprised bistable flip-flops, each of which has comprised two amplifying elements interconnected in a flip-flop configuration. In the case of a modulo 9 check, this has necessitated the use of at least four flip-flop circuits, or a total of eight amplifying devices.

In accordance with the teachings of the present invention, there has been provided a new and novel circuit embodying a tristable circuit, two of which, when connected in appropriate cooperative relationship, can provide for a modulo 9 check. The use of two such tristable circuits, wherein each tristable circuit embodies three amplifying devices functioning in a bistable manner (conducting or non-conducting), permits the modulo 9 check to be implemented using a total of only six amplifying devices. The circuit reduction that is realized by using tristable circuits is of extreme importance, particularly in those instances wherein high-speed circuits are involved and the components which must be used are costly.

It is accordingly a more specific object of the present invention to provide a new and improved checking circuit that is adapted to be implemented by way of a tristable circuitry.

In accordance with a further feature of the present invention, a pair of tristable circuits are combined with suitable input logic and a further tristable storage register in order to implement a static accumulation in accordance with a predetermined modulus of input data received from a data source. Associated with the pair of tristable circuits is a suitable check circuit capable of giving an indication of whether or not there is an agreement between an existing weight count carried with data being manipulated and a weight count generated from the data being manipulated.

It is therefore a still further more specific object of the present invention to provide a new and improved circuitry for monitoring the accuracy of the manipulation of data wherein the circuitry comprises a pair of tristable circuits associated with a logical network and a tristable storage network to effect a predetermined accumulation to check a data manipulation.

The foregoing objects and features of novelty which characterize the invention, as well as other objects of the invention, are pointed out with particularity in the claims annexed to and forming a part of the present specification. For a better understanding of the invention, its advantages and specfic objects attained with its use, reference should be had to the accompanying drawings and descriptive matter in which there is illustrated and described a preferred embodiment of the invention.

Figure 1:
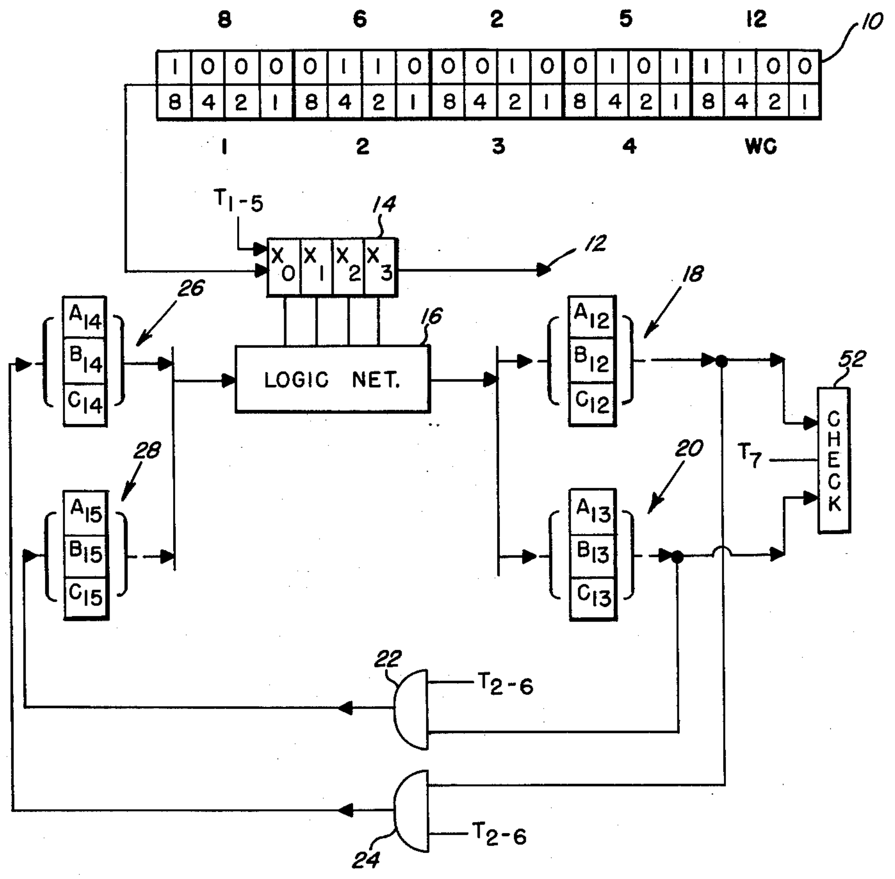
FIGURE 1 is a diagrammatic representation of one manner in which the present invention may be arranged.

Referring first to FIGURE 1, the numeral 10 identifies an input register which is adapted to contain information which is to be manipulated. The manipulation may be, for example, a simple transfer from one point in a data processing system to another. For purposes of the present explanation, the input register 10 is assumed to comprise a register having twenty bits of data storage, sixteen of which are used to represent data, and four of which are used to represent its satellite checking data which may be referred to as a weight count. The sixteen data bits may be divided, for example, into groups of four, so that binary coded decimal information may be represented by each four-bit combination. The individual bit positions of each four-bit group in the register may be weighted in accordance with the binary notation of 8, 4, 2, and 1. It is further assumed that the data stored in the register 10 may be represented by the decimal number 8625.

By utilizing apparatus such as illustrated and described in the abovementioned Bloch patent, it is possible to produce a weight count or satellite which may be appended to the data. If the modulo 9 summing scheme has been utilized in generating the weight count, the weight count for the number 8625 will be 3. In actual implementation, however, it has become the practice to complement the weight count with respect to 15, and carry that number as a satellite rather than a direct sum, modulo 9, of the information. Thus, with the weight count normally being a decimal 3 for the number 8625, the complemented weight count becomes binary-coded decimal 12, or a binary 1100. As will be readily apparent to those skilled in the art, the summing of the weighted bits in the binary coded decimal information with the binary coded weight count in complemented form will yield a constant. The constant in the case of a modulo 9 summing scheme will always be a binary coded decimal 6, or 0110. If the resultant summing of the data bits and the check bits do not produce a binary coded decimal 6, there is an error.

Register 10 is assumed to be a serial register which is adapted to deliver the data stored therein to an output terminal 12 by way of a serial-to-parallel transfer register 14, the latter being a four-bit register capable of shifting the data from the information into a logical network 16 by way of a parallel transfer. The logical network 16 is arranged to cooperate with a pair of tristable circuits 18 and 20. The tristable circuit 18 includes three sections $A_{12}$, $B_{12}$, and $C_{12}$. The tristable circuit 20 includes three sections $A_{13}$, $B_{13}$, and $C_{13}$. The outputs of the two tristable circuits 18 and 20 are arranged for coupling through suitable gating means 22 and 24 to a further pair of tristable circuits 26 and 28. The gating means 22 and 24, while symbolically represented as single gates, will preferably take the form of separate AND gates coupling each level of the tristable register circuits 18 and 20 to the corresponding level in the tristable register circuits 26 and 28 respectively. The tristable circuit 26 includes three sections $A_{14}$, $B_{14}$, and $C_{14}$. The tristable circuit 28 includes three sections $A_{15}$, $B_{15}$, and $C_{15}$. The tristable circuits 26 and 28 are arranged to supply output signals to the logical network 16 and are, in effect, acting as storage for the previous sum which is initially set up in the tristable circuits 18 and 20. This permits the combination, or the adding of the weighted values of the incoming bits from register 14 with the modulo 9 sum already in the circuits.

Before considering the detailed operation of the circuitry of FIGURE 1, it should be noted that each of the tristable circuits 18, 20, 26, and 28 are arranged so that three specific tristable states are defined, namely, 011, 101, and 110. These three states may then be interpreted as a 0, 1, and 2 respectively. Inasmuch as two of the tristable registers are considered in combination, it is possible to define nine distinct states. These nine distinct states are as follows:

| | |
|---|---|
| 0 0 | 0 or 9 |
| 0 1 | 1 or 10 |
| 0 2 | 2 or 11, etc. |
| 1 0 | 3 |
| 1 1 | 4 |
| 1 2 | 5 |
| 2 0 | 6 |
| 2 1 | 7 |
| 2 2 | 8 |

Figure 2:
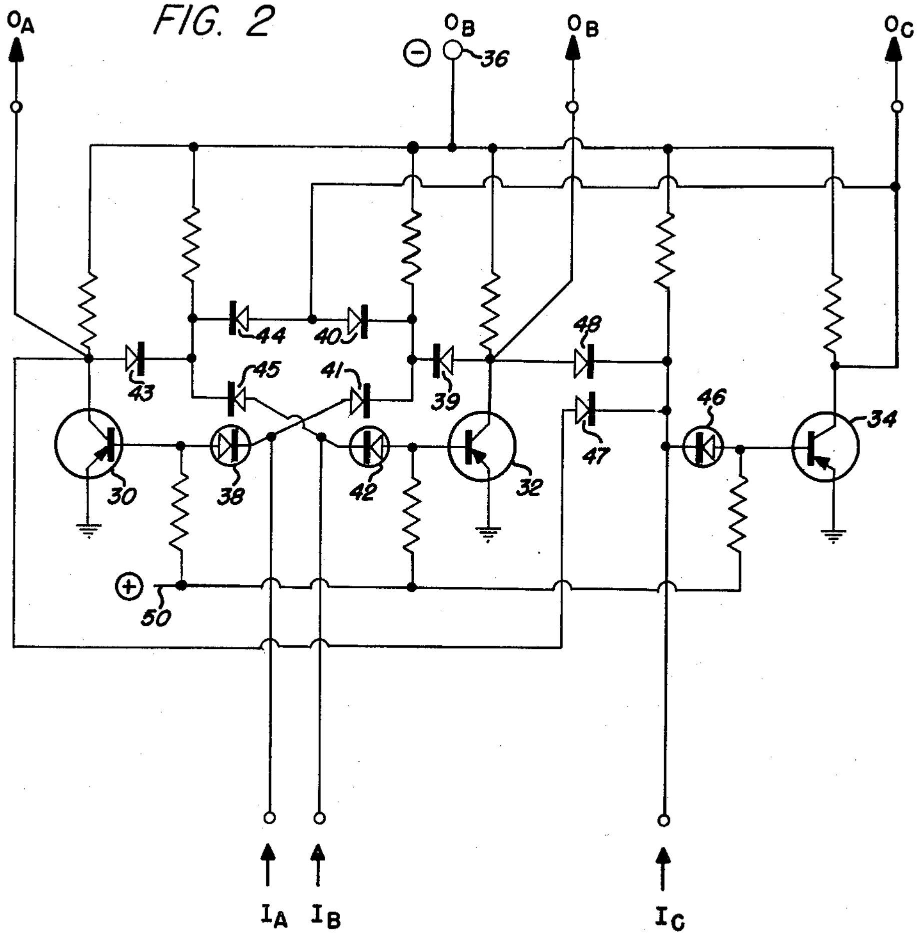
FIGURE 2 is a schematic representation of a suitable tristable circuit for use in the apparatus of FIGURE 1.

Referring to FIGURE 2, the details of a typical tristable circuit usable in the circuitry of FIGURE 1 is illustrated. The circuit will be seen to comprise a three-transistor circuit having the respective stages thereof cross-coupled so as to define the above identified stable states. The inputs are by way of the input terminals $I_A$, $I_B$, and $I_C$. The outputs are by way of the terminals $O_A$, $O_B$, and $O_C$.

Considering FIGURE 2 more specifically, there is provided a first transistor 30, a second transistor 32, and a third transistor 34, each of said transistors including the normal base, emitter and collector electrodes. As illustrated, the emitters of the three transistors are all connected to ground, while the collectors are connected through suitable loading resistors to a negative power supply terminal 36. Each of the transistors 30, 32, and 34 are arranged to cooperate with germanium-silicon diode gating circuits for purposes of controlling the conductive conditions in the other associated transistors. Thus, on the input of the transistor 30, there is provided a silicon diode 38 and germanium diodes 39 and 40, along with an isolating diode 41. The input gating circuitry for the transistor 32 is by way of the silicon diode 42, a pair of germanium diodes 43 and 44, and an isolating diode 45. Similarly, the input to the transistor 34 is by way of a silicon diode 46, and a pair of germanium diodes 47 and 48.

A detailed discussion of the germanium-silicon diode gating circuit will be found in a copending application of the present inventor bearing the Serial Number 614,839, now Patent No. 2,986,652, and filed October 9, 1956.

In the event that an input signal is applied to the input terminal $I_A$, the transistor 30 will be switched into a conductive state such that the collector thereof will be effectively connected to ground. The grounding of the collector of the transistor 30 will cause the diode 43 to be conductive, and the diode 47 to be conductive. The rendering of the diode 43 conductive will drop the potential on the silicon diode 42 below its conducting threshold so that a positive bias from a bias line 50 will be effective to maintain the transistor 32 cutoff. Similarly, with diode 47 conducting, the potential on the silicon diode 46 will be below its conducting threshold and, consequently, the transistor 34 will be biased to cut off by way of the positive bias from the bias line 50. Thus, an input on line $I_A$ will produce an output on line $O_A$.

Similar application of an input signal to the terminal $I_B$ or the terminal $I_C$ will be effective to switch the respective transistors 32 or 34 into conduction.

Referring back to FIGURE 1, the circuit as illustrated is arranged to add, modulo 9, each four bits as they come up and are transferred from the register 10 to the register 14, and then into the logical network 16. The gating of each four bits in register 10 into register 14 is under control of the system clock, not shown, which produces the timing signals $T_1$—$T_7$ for each word. The implementation of the logical network may be in accordance with the gating and buffering circuits illustrated in the above-mentioned application of the present inventor. The logic, however, for the over-all accumulator stage, which includes the logical network 16 of the registers 18, 20, 26, and 28, may best be understood by reference to the following Boolean statements:

$\overline{A}_{14}=B_{14}C_{14}+P_2B_{12}C_{12}$. $\overline{D}_{14}=A_{14}$ $\overline{B}_{14}=A_{14}C_{14}+P_2A_{12}C_{12}$. $\overline{E}_{14}=B_{14}$ $\overline{C}_{14}=A_{14}B_{14}+P_2A_{12}C_{12}$. $\overline{F}_{14}=C_{14}$ $\overline{A}_{15}=B_{15}C_{15}+P_2B_{13}C_{13}$. $\overline{D}_{15}=A_{15}$ $\overline{B}_{15}=A_{15}C_{15}+P_2A_{13}C_{13}$. $\overline{E}_{15}=B_{15}$ $\overline{C}_{15}=A_{15}B_{15}+P_2A_{13}B_{13}$. $\overline{F}_{15}=C_{15}$ In the foregoing statements, the term $P_2$ is considered the clock pulse used in shifting the data stored in the circuits 18 and 20 to the circuits 26 and 28. Since a total of five separate operations are needed to effect the total operation described below, the term $P_2$ may be considered the system clock timing signals $T_{2\text{-}6}$.

The resetting logic for $A_{14}$, from the above statement, will be seen to comprise effectively two AND gating circuits, either of which can switch the $A_{14}$ circuit to the reset state, $\overline{A_{14}}$. Thus, if the circuits $B_{14}$ and $C_{14}$ are both set, or if, upon the occurrence of the clock pulse $P_2$, with $B_{12}$ and $C_{12}$ both set, then $A_{14}$ will be reset to produce $\overline{A_{14}}$.

The actual implementation may be done using any of several well-known types of AND-OR logic circuits having the inputs which represent the signals from the stages illustrated in the drawings. Applicant's above-mentioned application describes apparatus suitable for this purpose.

$$\overline{A}_{12}=B_{12}C_{12}+X_0F_{14}+X_1E_{14}+X_2F_{14}+X_3E_{14}$$
$$\overline{B}_{12}=A_{12}C_{12}+X_0D_{14}+X_1F_{14}+X_2D_{14}+X_3F_{14}$$
$$\overline{C}_{12}=A_{12}B_{12}+X_0E_{14}+X_1D_{14}+X_2E_{14}+X_3D_{14}$$

$$\overline{A}_{13}=B_{13}C_{13}+X_0C_{14}D_{15}+X_0F_{14}F_{15}+X_1A_{14}F_{15}+X_1D_{14}D_{15}+X_2C_{14}F_{15}+X_2F_{14}E_{15}+X_3D_{14}E_{15}$$
$$\overline{B}_{13}=A_{13}C_{13}+X_0C_{14}E_{15}+X_0F_{14}D_{15}+X_1A_{14}D_{15}+X_1D_{14}E_{15}+X_2C_{14}D_{15}+X_2F_{14}F_{15}+X_3A_{14}E_{15}+X_3D_{14}F_{15}$$
$$\overline{C}_{13}=A_{13}B_{13}+X_0C_{14}F_{15}+X_0F_{14}E_{15}+X_1A_{14}E_{15}+X_1D_{14}F_{15}+X_2C_{14}E_{15}+X_2F_{14}D_{15}+X_3A_{14}F_{15}+X_3D_{14}D_{15}$$

It will be apparent that the logic for the equations for circuits $A_{12}$, $B_{12}$, $C_{12}$, $A_{13}$, $B_{13}$, and $C_{13}$ includes the inputs from the data register 14, $X_0$–$X_3$ as well as the circuits 26 and 28. As with the equations discussed above, the logic may be implemented using a series of AND-OR circuits which have inputs corresponding to the inputs listed in the equations.

Figure 3:
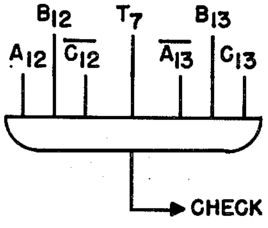
FIGURE 3 is a diagrammatic representation of logical circuitry for checking the output of the circuit of FIGURE 1.

With the assumed data indicated in FIGURE 1 stored in register 10, namely, the decimal 8625, with the complemented weight count of binary coded decimal 12, the data will be transferred from the register 10 to the register 14 so that at a preselected clock time $T_1$, the first four bits representing the decimal 8, or the binary coded decimal 1000, will be transferred from the register 14, into the logical network 16. The logical network 16 will translate this input decimal 8 into a code to be stored in the two tristable registers 18 and 20 such that both stages will be set with a 110 to represent the decimal number 8. At clock time $T_2$, this data will be transferred around to the register circuits 26 and 28 and then combined with the next incoming four bits from the register 14. With a binary coded decimal 6, 0110, being applied from the register 14 to the logical network along with the coded decimal 8, the resultant output delivered to the registers 18 and 20 will be a coded modulo 9 sum of 8 and 6, or a 5. Thus, the register 18 and the register 20 will be set to define the number 5 as indicated in the above table, namely, 101 and 110. The data in the registers 18 and 20 will then again be transferred over to the registers 26 and 28 for combining with a third decimal digit received at clock time $T_3$, namely, the binary coded decimal 2, or a binary 0010. The resultant sum which would be set up in the registers 18 and 20 would be a 7, or in the tristable setting of the registers 18 and 20, there will be a 110 and a 101. This resultant sum will once again be recirculated at clock time $T_4$ to the registers 26 and 28 to be combined with the fourth incoming binary coded decimal digit which is a 5, or a binary 0101. The resultant sum will then be reduced, modulo 9, to a 3. At time $T_5$ the adding of the complement and weight count, or binary coded decimal 12, to the sum of the numbers 8625, in reducing the resultant sum to a mod 9 will be effected to yield a setting of 6. The settings on the registers will be in accordance with the above table, namely, 110 and 011. This defines the numeral 6 indicating there has been a proper transfer of the data. The checking of this may be effected by way of the coincidence gating circuit illustrated in FIGURE 3. In this circuit, a logical gate is provided to be opened at clock time $T_7$ to sample the outputs of the registers 18 and 20. In the event that there is a 6 stored in the registers 18 and 20, an appropriate check pulse will be passed through the gate 52, which may be used for initiating a further data manipulation, as will be understood by those skilled in the art.

While the above described paragraph has been related to a circuit operating modulo 9, it will be readily apparent to those skilled in the art that the principles of the present invention may well be adapted to a numbering system using a different radix. Further, while the tristable circuit is shown to be implemented by way of transistors, it may obviously be implemented in other ways in accordance with the teachings of the invention.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. In apparatus for checking the manipulation of data processing words wherein each such word includes a plurality of data bits and a satellite check bit representation in the form of the modulo *n* sum of the data bits, the combination comprising a pair of tristable circuits, input means connected to said tristable circuits to set said circuits in accordance with the modulo *n* sum of the input data bits and the check bit representation, and check means connected to the outputs of said tristable circuits.

2. In apparatus for checking the manipulation of digital data wherein such data combination includes a plurality of data bits and a satellite check bit representation in the form of the modulo *n* sum of the data bits, the combination comprising first and second tristable circuits, input logical means connected to said tristable circuits to set said circuits in accordance with the modulo *n* sum of the input data bits and the check bit representation, checking circuit means having an output indicative of error-free manipulation upon the completion of such manipulation, and means connecting said circuit means to the outputs of said first and second tristable circuits.

3. In apparatus for checking the manipulation of digital data wherein each such data combination includes a plurality of data bits and a satellite check bit representation in the form of the modulo *n* sum of the data bits, the combination comprising a pair of tristable circuits, said tristable circuits each being adapted to assume one of three stable states, input means connected to said tristable circuits to set said circuits in accordance with the modulo *n* sum of the input data bits and the check bit representation, timing means, and checking means connected to the outputs of said pair of tristable circuits, said checking means being effective at a time selected by said timing means to produce an output check signal upon the completion of a data manipulation.

4. A transfer weight count accumulator for checking the manipulation of digital data comprising a pair of electronic registers, each of said registers comprising three conducting elements having means interconnecting said conducting elements so that each said register may assume one of three stable states, input gating means connected to said registers to set the tristable state of each register in accordance with the assigned numerical significance of the input digital data, and numerical checking means connected to the outputs of said registers.

5. A transfer weight count accumulator for checking the manipulation of digital data comprising a pair of electronic registers, each of said registers comprising three conducting elements having logical means interconnecting said conducting elements so that only one of said conducting elements will be in one state and the other two will be in an opposite state to thereby define three stable states, input gating means connected to said registers to set the tristable state of each register in accordance with the assigned numerical significance of each bit of input digital data, and numerical checking means connected to the outputs of said registers.

6. A transfer weight count accumulator for checking the manipulation of digital data comprising a pair of electronic registers, each of said registers comprising three conducting elements having means interconnecting said conducting elements so that each said register may assume one of three stable states, timing means, a data source input gating means connected to said registers, said gating means having said timing means and said data source connected to set the tristable state of each register in accordance with the assigned numerical significance of the input digital data from said data source, and numerical checking means connected to the outputs of said registers.

7. Checking apparatus for digital data having associated therewith satellite check data comprising a first pair of tristable registers, a second pair of tristable registers, circuit means coupling the outputs of said first pair of registers to the inputs of said second pair of registers, a data input, a logical circuit coupling network, and circuit means including said logical network connecting said data input and the output of said second pair of registers to the inputs of said first pair of registers.

8. Checking apparatus for digital data having associated therewith satellite check data comprising a first pair of tristable registers, a second pair of tristable registers, circuit means coupling the outputs of said first pair of registers to the inputs of said second pair of registers, a data input, an adding network, and circuit means including said adding network connecting said data input and the output of said second pair of registers to the inputs of said first pair of registers to produce the sum of all of the input data.

9. Checking apparatus for digital data having associated therewith satellite check data comprising a first pair of tristable registers, a second pair of tristable registers, circuit means coupling the outputs of said first pair of registers to the inputs of said second pair of registers, a data input, a modulo $n$ adding network, and circuit means including said adding network connecting said data input and the output of said second pair of registers to the inputs of said first pair of registers to produce the modulo $n$ sum of all of the input data.

10. Checking apparatus as defined in claim 9 wherein said modulo $n$ adding network is a modulo 9 adding network.

No references cited.